United States Patent
Kazmi et al.

(10) Patent No.: US 9,124,410 B2
(45) Date of Patent: Sep. 1, 2015

(54) MULTICARRIER TRANSMISSION METHOD AND APPARATUS

(75) Inventors: Muhammad Kazmi, Bromma (SE); Rong Hu, Sollentuna (CN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 103 days.

(21) Appl. No.: 13/202,287

(22) PCT Filed: Oct. 16, 2009

(86) PCT No.: PCT/SE2009/051178
§ 371 (c)(1),
(2), (4) Date: Aug. 18, 2011

(87) PCT Pub. No.: WO2010/095992
PCT Pub. Date: Aug. 26, 2010

(65) Prior Publication Data
US 2011/0300857 A1    Dec. 8, 2011

Related U.S. Application Data

(60) Provisional application No. 61/154,025, filed on Feb. 20, 2009.

(51) Int. Cl.
*H04L 5/00* (2006.01)
*H04L 1/00* (2006.01)
(Continued)

(52) U.S. Cl.
CPC ............ *H04L 5/0094* (2013.01); *H04L 1/0006* (2013.01); *H04L 1/0009* (2013.01);
(Continued)

(58) Field of Classification Search
CPC ... H04L 5/0094; H04L 1/0025; H04L 1/0071; H04L 1/04; H04L 1/08; H04L 1/0009; H04L 5/006; H04L 5/0042; H04L 1/0006; H04W 28/18
USPC ........ 455/3.04, 450–452.2, 68–703; 370/320, 370/329, 335, 341
See application file for complete search history.

(56) References Cited

U.S. PATENT DOCUMENTS 8,149,810 B1 * 4/2012 Narasimhan et al. ......... 370/343
2005/0068884 A1 * 3/2005 Yoon et al. .................... 370/203
(Continued)

FOREIGN PATENT DOCUMENTS

EP     1953971 A1    8/2008
WO  2006/072821 A1  7/2006
(Continued)

OTHER PUBLICATIONS

3rd Generation Partnership Project. 3GPP TSG RAN WG1#43, R1-051402, Seoul, Korea, Nov. 7-11, 2005.
(Continued)

*Primary Examiner* — Nathan Mitchell
(74) *Attorney, Agent, or Firm* — Coats & Bennett, PLLC

(57) ABSTRACT

A signaling mechanism is provided to indicate to the user equipment which mode is currently in use for uplink and/or downlink transmission in a system supporting different transmission modes of a multicarrier radio system, such as a HSPA system or another radio system. Using such signaling a particular mode can be dynamically or semi-dynamically activated according to the need, UE reported events or measurements, BS measurements, type of service, DRX cycle in use etc.

16 Claims, 3 Drawing Sheets

(51) Int. Cl.
  *H04L 1/04* (2006.01)
  *H04L 1/08* (2006.01)
  *H04W 28/18* (2009.01)

(52) U.S. Cl.
  CPC ............ *H04L1/0025* (2013.01); *H04L 1/0071* (2013.01); *H04L 1/04* (2013.01); *H04L 1/08* (2013.01); *H04L 5/006* (2013.01); *H04L 5/0042* (2013.01); *H04W 28/18* (2013.01)

(56) References Cited

U.S. PATENT DOCUMENTS

| | | | | |
|---|---|---|---|---|
| 2005/0207441 | A1* | 9/2005 | Onggosanusi et al. | 370/464 |
| 2006/0280142 | A1* | 12/2006 | Damnjanovic et al. | 370/329 |
| 2007/0098097 | A1 | 5/2007 | Khan et al. | |
| 2008/0117867 | A1* | 5/2008 | Yin et al. | 370/329 |
| 2010/0091919 | A1* | 4/2010 | Xu et al. | 375/346 |

FOREIGN PATENT DOCUMENTS

| | | |
|---|---|---|
| WO | 2006/125149 A2 | 11/2006 |
| WO | 2007015962 A2 | 2/2007 |
| WO | 2008051038 A1 | 5/2008 |
| WO | 2008057969 A2 | 5/2008 |
| WO | 2009002087 A1 | 12/2008 |

OTHER PUBLICATIONS

3rd Generation Partnership Project. 3GPP TR 25.825, V1.0.0 (May 2008). 3rd Generation Partnership Project; Technical Specification Group Radio Access Network; Dual-Cell HSDPA operation. May 2008.

Attar, R. et al. "Evolution of cdma2000 Cellular Networks: Multicarrier EV-DO." IEEE Communications Magazine, Mar. 2006.

Huibin, L. et al. "Scheduling and Performance of Multicarrier TD-SCDMA HSDPA." Second International Conference on Communications and Networking in China, Aug. 22-24, 2007.

NTT Docomo, Inc., "Investigation on Transport Block Mapping Scheme for LTE-Advanced", 3GPP TSG RAN WG1 Meeting #55bis, Ljubljana, Slovenia, Jan. 12, 2009, pp. 1-16, R1-090309.

3rd Generation Partnership Project, "3rd Generation Partnership Project; Technical Specification Group Radio Access Network; User Equipment (UE) radio transmission and reception (FDD) (Release 8)", Technical Specification, 3GPP TS 25.101 V8.5.1, Jan. 1, 2009, pp. 1-214, 3GPP.

3rd Generation Partnership Project, "3rd Generation Partnership Project; Technical Specification Group Radio Access Network; Base Station (BS) radio transmission and reception (FDD) (Release 8)", Technical Specification, 3GPP TS 25.104 V8.5.0, Dec. 1, 2008, pp. 1-82, 3GPP.

3rd Generation Partnership Project, "3rd Generation Partnership Project; Technical Specification Group Radio Access Network; Physical channels and mapping of transport channels onto physical channels (FDD) (Release 8)", Technical Specification, 3GPP TS 25.211 V8.3.0, Dec. 1, 2008, pp. 1-56, 3GPP.

3rd Generation Partnership Project, "3rd Generation Partnership Project; Technical Specification Group Radio Access Network; Physical layer procedures (FDD) (Release 8)", Technical Specification, 3GPP TS 25.214 V8.4.0, Dec. 1, 2005, pp. 1-92, 3GPP.

3rd Generation Partnership Project, "3rd Generation Partnership Project; Technical Specification Group Radio Access Network; Radio Resource Control (RRC); Protocol Specification (Release 8)", Technical Specification, 3GPP TS 25.331 V8.5.0, Dec. 1, 2008, pp. 1-1646, 3GPP.

* cited by examiner

MULTICARRIER TRANSMISSION METHOD AND APPARATUS

TECHNICAL FIELD

The present invention relates to a method and a device for transmission in a multicarrier system.

BACKGROUND

Operation of Wideband Code Division Multiple Access (WCDMA)/High Speed Packet Access (HSPA) on multiple 5 MHz frequency blocks, sometimes referred to as "carriers" is one further step of evolving WCDMA and HSPA. This mode of operation is often referred to as Multi Carrier WCDMA or Multi Carrier HSPA, in the following referred to as "multi carrier HSPA".

A multi carrier (MC) arrangement with frequency division duplex (FDD) can be described as a set of downlink carriers linked to a set of uplink carriers. The downlink carriers can be adjacent or non-adjacent in the frequency domain, and the same holds for the uplink carriers. More general, carriers do not need to be in the same band and Time division duplex (TDD) bands could also be used as part of the multi carrier operation.

Some of the Radio Frequency (RF) requirements such as receiver sensitivity level or blocking characteristics are generally dependent upon the frequency band of operation as is further described in third Generation Partnership (3GPP) specification No. TS 25.101, "User Equipment (UE) radio transmission and reception (FDD)", and 3GPP TS 25.104, "Base station (BS) radio transmission and reception (FDD)".

For instance in WCDMA the User Equipment (UE) receiver sensitivity level for band I (2 GHz) is 3 dB lower than that for band VIII (900 MHz). The differences in RF requirements are not only due to the frequency of operation but other factors such as duplex gap, co-existence scenarios, etc. Thus, multiple carriers from different bands at least for certain bands would exhibit different performance leading to different coverage.

Another aspect of the multi carrier arrangement is the possibility of specifying asymmetrical number of carries in different directions. For instance the number of downlink carriers can be set different from the number of uplink carriers e.g. 4 downlink and 2 uplink carriers. Furthermore, dynamically or semi-dynamically the number of carriers activated at a time can be configured by the network node.

The availability of more than one carrier either in the downlink or uplink or in both directions enables the use of more than one carrier for data transmission. The manner in which multiple carriers can be used for data transmission leads to the following possible transmission modes, which are elaborated further below:

Transmission mode #1: different data blocks over different carriers
Transmission mode #2: interleaved data block over different carriers
Transmission mode #3: repetitive data block over different carriers
Transmission mode #4: repetitive data block over different carrier in different Transmission Time Intervals (TTI)

Transmission Mode #1: Different Data Blocks Over Different Carriers

The main objective of this mode is to increase data rate since the same UE simultaneously receives more than one data block. In case of N activated carriers, the data rate can be increased N times compared to that in single carrier case.

This scheme is used or known in the legacy multicarrier systems such as HSPA, see 3GPP specification No. TS 25.211, "Physical channels and mapping of transport channels onto physical channels (FDD)", and advanced Evolved Universal Mobile Telecommunications System Terrestrial Radio Access Network (E-UTRAN) in the downlink and also envisaged for the uplink in advanced E-UTRAN and also in the next phase of HSPA evolution.

However, the UE may not require the use of all possible carriers for downlink or uplink transmissions. Thus, in existing systems the network signals UE to activate or deactivate the use of multiple carriers for transmission #1 in order to save UE power consumption and to reduce the UE and network complexity, see 3GPP specification No. TS 25.214, "Physical layer procedures (FDD)". Separate signaling is used for uplink and downlink.

Transmission Mode #2: Interleaved Data Block Over Different Carriers

In a multi carrier HSPA system the multiple carriers are typically used for increasing the transmission rate by transmitting different data blocks over different carriers for a same UE. However, in this transmission scheme one data block is sent over more than one carrier. This also enables the data block to benefit from the frequency diversity. However, no combining is required at the receiver node. Instead the decoding of the data block requires the receiver node to demodulate all carriers over which the date block is interleaved. This scheme is envisaged for use in the advanced E-UTRAN. Although this scheme can improve coverage, the main reason is to use this scheme for transmitting a large data block, which is difficult to transmit successfully over a single carrier.

Transmission Mode #3: Repetitive Data Block Over Different Carriers

According to this scheme the coverage can be increased and/or the base station transmission power can be reduced by transmitting the same data block over different carriers to the same UE during the same transmission time interval (TTI) in the downlink. This also leads to frequency diversity. Furthermore this scheme can also be used in the uplink to improve the uplink coverage and/or the UE transmission power.

This scheme may be used for median or low rate services in order to increase the coverage, for instance, low rate services like Voice over Internet Protocol (VoIP) even if one carrier would be sufficient. In this scheme the same data block is repeated over multiple carriers. Thus, in the downlink the UE has to combine the data block received via different carriers. Similarly in the uplink the base station will do the combining if this scheme is used. Compared to scheme #2, this scheme is expected to be less complex for both UE and the Base Station. However from performance perspective the differences may be minor.

The different possible combining schemes will now be described.

Combining Schemes for Transmission Mode #3:

The UE can combine the data block using any of the below methods:
Selective combining
Soft combining In selective combining the UE chooses the correctly received data block after separately decoding each block and sends it to the higher layers for further processing.

In soft combining the UE decodes the data block after combining the soft bits or symbols from the data blocks received on different carriers and sends the decoded block to the higher layers.

In both cases the UE sends single acknowledge/negative acknowledge (ACK/NACK) regardless of the carriers used for the transmission of the data block.

Transmission Mode #4: Repetitive Data Block Over Different Carriers in Different TTI In this scheme the same data block is sent on different carriers but at different TTIs, which is similar to the concept of frequency hopping. The purpose of this scheme is also to improve coverage by the virtue of frequency and time diversity.

There is a constant demand to increase the efficiency of a radio system and to utilize existing resources in an optimal way.

SUMMARY

It is an object of the present invention to improve the systems providing several transmission modes as described above.

In a practical multicarrier system more than one transmission mode may be used to serve different purposes e.g. to enhance coverage, to increase user data rate, to improve resource utilization in terms of frequency, time and transmit power and so on.

As has been realized by the inventors existing systems do not provide a signaling mechanism to support several transmission modes.

In existing HSPA multicarrier systems there is signaling to support dynamic activation of transmission mode #1. But this is not sufficient if other schemes such as mode #3 (repetitive data over multiple carriers) are to be supported.

For example, two downlink carriers are supposed to be used for two multi-carrier capable UEs simultaneously. Mode 1 is used for UE1 with a high data rate while Mode 3 is used for UE2 with a low data rate. Both UEs need to be aware of which mode is used by the network.

In another multicarrier scenario, assume 4 downlink carriers are available. The same UE receives the non-real time delay insensitive packet data using mode #1 over 2 carriers whereas mode #3 is used for receiving the delay sensitive VoIP over the remaining 2 carriers.

Like in the downlink, different transmission modes can also be used in the uplink by the UE for the uplink transmission. Thus also for the uplink transmission the network node needs to be aware which transmission mode and the corresponding carriers are used by the UEs. The mode to be used for the uplink data transmission is also configured by the network.

In accordance with the present invention a signaling mechanism is provided to indicate to the receiver which mode is currently in use in a system supporting different transmission modes of a multicarrier radio system, such as a HSPA system or another radio system. Using such signaling a particular mode can be dynamically or semi-dynamically activated according to the need, type of service etc.

A method and a device for dynamically controlling the transmission mode(s) and the corresponding component carriers used by the network for the said transmission modes at a given time are disclosed.

In accordance with one embodiment the transmission modes can be switched dynamically or semi-dynamically by means of sending transmission mode switch command to the UE via the anchor or the serving or the primary carrier.

The same principle can be applied for the dynamic or semi-dynamic activation of the uplink transmission modes. In this case as well the network node sends the transmission mode switch command.

In accordance with one embodiment a criteria is used to select a particular mode. The criteria can for example be based on one or more measurements and/or mode selection reported event(s).

Since multicarrier can also be used in the uplink therefore these schemes are equally applicable for uplink multicarrier transmission scenarios. Therefore the ideas of the invention are also applicable for both downlink and uplink multicarrier scenarios.

BRIEF DESCRIPTION OF THE DRAWINGS

The present invention will now be described in more detail by way of non-limiting examples and with reference to the accompanying drawings, in which.

DETAILED DESCRIPTION

Figure 1:
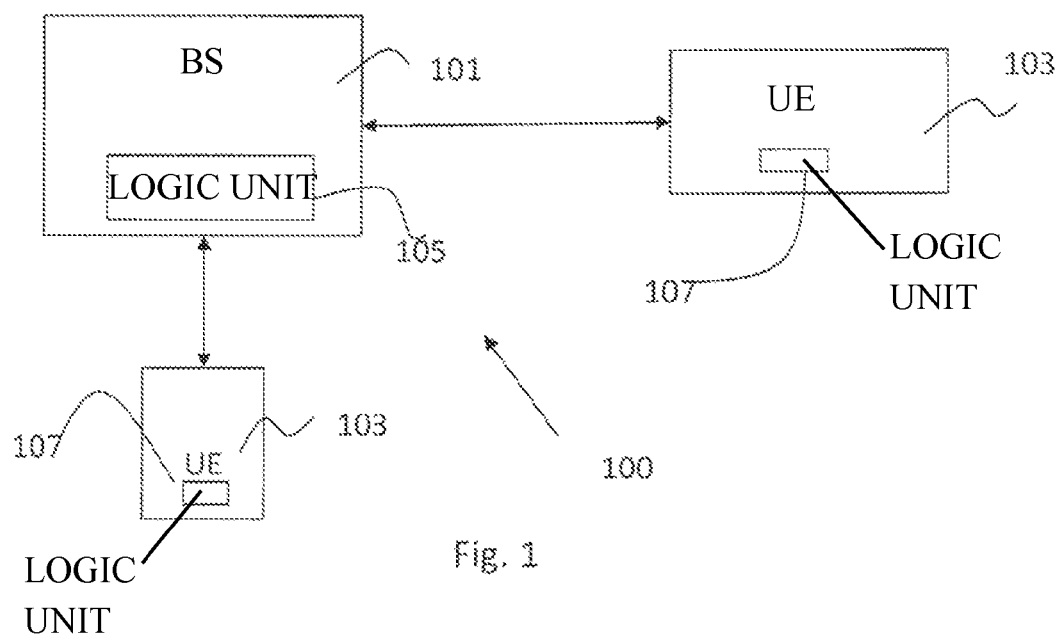
FIG. 1 is a general view of a cellular radio system configured to transmit data using multiple carriers.

In FIG. 1 a general view of a cellular radio system 100 configured to transmit data using multiple carriers is depicted. The system 100 comprises a number of base stations 101, whereof only one is shown for reasons of simplicity. The base station 101 can connect to user equipments 103 located in the area served by the base station 101. The base station 101 and comprises logic 105 to select and signal which mode of a number of multicarrier modes that is currently in use. The user equipment comprises corresponding logic 107 to select transmission mode based on a selection signaled by the base station and to report different events impacting the selection made by the base station.

In the following a multicarrier system comprising of two or more carriers is assumed. In accordance with one embodiment a mode Switching or Selection Criteria is provided. Thus, in a particular scenario a particular mode can be more beneficial to use. For instance a mode with repetitive data block mapped over multiple carriers (mode #3 above) can be used when a UE is close to the cell border or has poor coverage.

Figure 2:
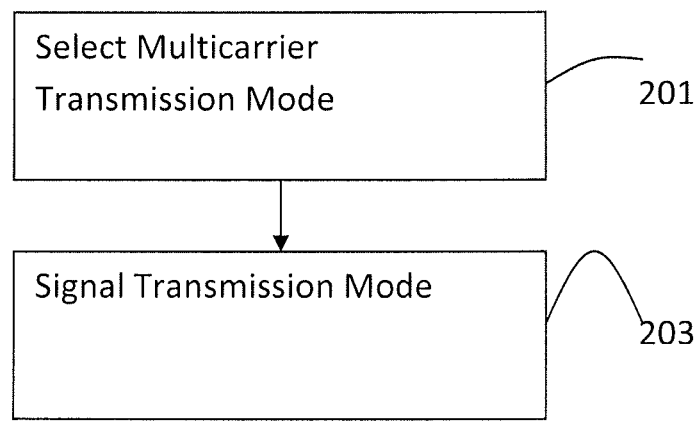
FIG. 2 is a flowchart illustrating procedural steps performed when switching between different multicarrier transmission modes.

In FIG. 2 a flowchart illustrating procedural steps performed when switching between different multicarrier transmission modes when transmitting data from a transmitter to a receiver is depicted. First in a step, 201

The selection can be based on one or more measurements performed by the User Equipment (UE) or Base station (BS) or combination thereof. Alternatively or to reduce signaling overheads, one or more UE reported events can be specified for the mode selection. Some exemplary criteria are described below in more detail.

Criteria based on UE measurements
    Criteria based on BS measurements
    Criteria based on UE and BS measurements
    Criteria based on UE reported events Based on UE Reported Measurements The UE reports a Channel Quality Indicator (CQI) or one or more mobility related measurements such as Common Pilot Channel (CPICH) Ec/No, CPICH received signal code power (RSCP) and carrier RSSI in WCDMA or reference signal received power (RSRP) and reference signal received quality (RSRQ) in Long term Evolution (LTE)) from the serving carrier or from multiple component carriers can be used to assess whether UE coverage is poor e.g. if it is in the cell border or not. In general term CPICH Ec/and RSRQ can be regarded as signal quality measurements since they are measured on known pilot or reference signals and depict the quality of the received signal from the base station. Similarly in general term CPICH RSCP and RSRP can be regarded as signal strength measurements since they are also measured on known pilot or reference signals but instead depict the strength or the received power level of the signal from the base station. Other existing UE reported measurements include block error rate (BLER).

If one or more UE reporting quantity is below its respective threshold then the network selects an appropriate transmission mode, such as a mode with repetitive data block mapped over multiple carriers. The selection of the most relevant mode (i.e. mode #3) in this scenario would ensure that UE can receive achieve higher rate even when coverage is bad.

Other UE reported measurements such as UE transmit power or UE power headroom (difference between UE maximum power and UE transmit power) can also be used for mode selection. These measurements are also specified in the UTRAN standard. In the cell border region when coverage is relatively poorer, the UE transmitted power is relatively higher. For instance if the UE transmitted power increases beyond certain threshold or/and UE power headroom rises above certain threshold then a mode with repetitive data block mapped over multiple carriers can be used. Otherwise i.e. when UE has good coverage, the network can use other modes such as a mode with different data blocks over different carriers (mode #1 above). The use of UE transmitted power or UE power headroom can be useful for the selection of the uplink transmission mode.

Based on BS Measurements

Another set of criteria can be based on one or more base station measurements e.g. Hybrid Automatic Repeat Request (HARQ) BLER, transmitted power etc. If for certain UE the base station transmitted power, such as the transmitted mean power exceeds certain threshold then base station switches to an appropriate mode for example a mode with repetitive data block mapped over multiple carriers mode or vice versa. This can particularly be used for the downlink mode selection.

Similarly HARQ BLER, which is measured over data blocks transmitted in the uplink, for example the enhanced uplink, E-DCH, can be used for uplink transmission mode selection.

Yet another criterion for the mode selection can be based on a ratio of transmitted power to the transmitted data block. In one embodiment the mean power to the mean size of transmitted data blocks ratio can be used. In one embodiment if such a ratio or a corresponding ratio is larger than a set threshold, the UE coverage is considered to be worse. In that event a unit in the network can be adapted to select appropriate transmission mode. For example the unit can be adapted to select a mode with repetitive data block mapped over multiple carriers (mode #3) if the ratio is below the threshold and adapted to select a mode with different data blocks over different carriers otherwise.

Based on Combined Measurements

In this embodiment any combination of one or more UE or base station downlink measurements and one or more UE or base station uplink measurements can be used to select an appropriate mode. The use of more than one measurement for the mode selection can result in a more robust decision.

Based on UE Reported Events

For the mode selection one option is that the network configures UE to report the periodical reports of one or more of the measurements. This will increase the signaling overheads and processing both at the UE and at the base station. Typically network uses event triggered reporting of measurements, which in turn are used for performing handovers. But such events are reported during a stage when handover is imminent. Thus they cannot be efficiently used for the mode selection. Therefore in order to reduce unnecessary feedback from the UE, one or more transmission mode selecting event can be specified. Secondly there can be different events for selection of uplink and downlink transmission modes.

Thus for allowing the UE to monitor the event reporting condition the network can configure a threshold for a particular type of measurement. Alternatively the event reporting condition can be specified based on more than one measurement i.e. one or more UE uplink or downlink measurements (e.g. UE transmitted power and CPICH measurements).

Furthermore the threshold(s) is linked to a particular transmission mode. The UE will report an event when the event condition is fulfilled. For instance if UE transmit power exceeds a certain configured threshold, the event is reported allowing the network to use an appropriate transmission mode. The thresholds can also be a pre-defined values defined in the standard.

Alternatively one or more of existing events can be used but by configuring them with different threshold levels and/or triggering conditions relevant for the selection of transmission mode.

When the event is reported the appropriate mode is selected. The mode selection can be implemented by using or more of the mechanisms described below.

There are different mechanisms and principles by which a transmission mode can be selected:

By Explicit Signaling
By Implicit Signaling
Pre-defined Rules for Transmission Modes
Hybrid Scheme; signaling and pre-defined rule These principles are discussed in detail in the following sections:

By Explicit Signaling

In this embodiment when the UE is scheduled an explicit indication is signalled to the UE by the network node via the anchor downlink carrier that the network is to use one of the transmission modes for this UE. Furthermore the signalling mechanism also indicates the carriers to be used for a particular transmission mode. The signalling mechanism also allows the network to configure the UE to use more than one transmission mode at a time e.g. different modes for different types of services.

Figure 3:
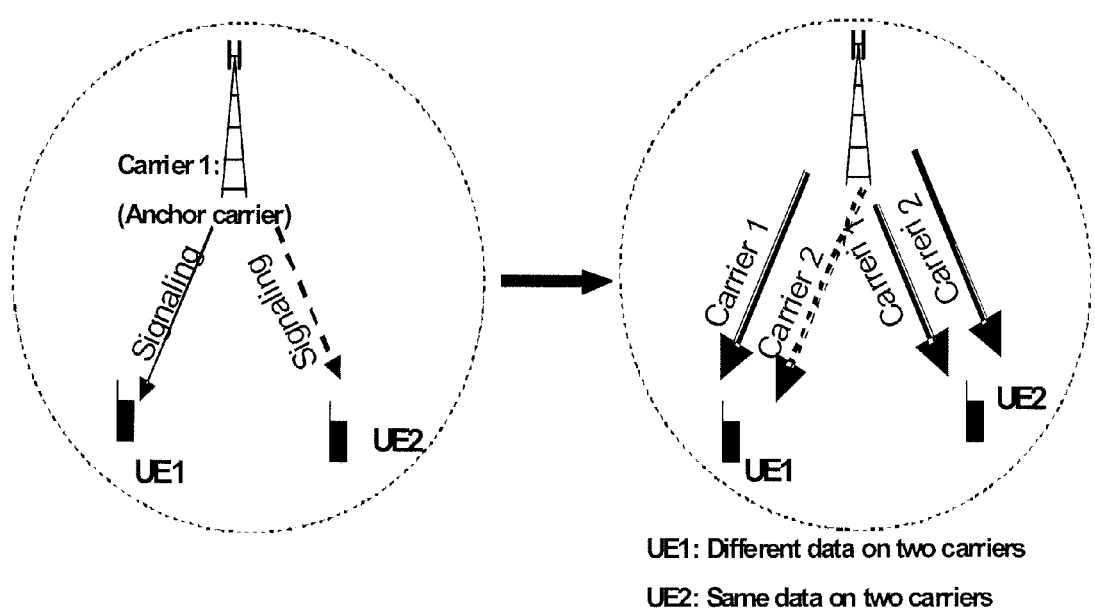
FIG. 3 is a view illustrating signaling performed when transmitting data using multicarrier transmission.

In the example in FIG. 3, the principle of explicit signalling is illustrated for the case when the UE is capable of simultaneously receiving two downlink carriers. FIG. 3 illustrates Mode 1 for a first UE (UE1) and Mode 2 for a second UE (UE2)

This principle can be extended to scenarios where UE is capable of receiving more than two downlink carriers. Furthermore similar principles can be extended for the uplink multicarrier scenario, where the network node also sends the mode switching or mode selection command to the UE.

An exemplary embodiment of explicit signalling is further illustrated in table 1 for the downlink.

TABLE 1

Explicit signalling for transmission mode selection

| Modes | Downlink carriers | | | |
|---|---|---|---|---|
| | 1 | 2 | ... | N |
| 1 | B11 | B11 | ... | B1N |
| 2 | B21 | B21 | ... | B2N |
| . | . | . | . | . |
| . | . | . | . | . |
| . | . | . | . | . |
| M | BM1 | BM1 | ... | BMN |

The table shows that the network node and a UE are capable of simultaneously transmitting and receiving N carriers. There are M possible transmission modes supported by the UE and the network node. The entries of the table Bij represents one bit of information and indicate to UE which carriers are activated. Thus, each entry in the table can be either 0 or 1. This means M possible code words, each representing the type of mode and the corresponding component carriers to be used for a particular mode, could be signalled to the UE. Hence, in such an embodiment the position of the bits in the code word is important.

If there are sufficient component carriers, for example four carriers, and the network node wants to configure the same for the same mode then more than one code word can be signalled to the same UE.

The meaning of the explicit signalling as shown in FIG. 3 is further illustrated by the following two examples.

Example 1

Configuration of Single Mode

In a first example consider a UE is capable of receiving four downlink carriers. Assume further that the two possible transmission modes are:
Mode #1 (different data blocks on different carriers)
Mode #3 (same data block on different carriers)

Assuming the above, one bit is needed for indicating the mode and 4 bits for indicating the carriers to be used for the activated mode.

Assume that the network node wants to configure UE to receive data over the last 2 consecutive carriers according to mode #1. As shown in table 2 the signalled code word will be: [0, 0, 0, 1, 1].

TABLE 2 code word for configuring mode #1 with 2 last carriers

| Mode | Downlink carriers | | | |
|---|---|---|---|---|
| (bit) | 1 | 2 | 3 | 4 |
| 0 | 0 | 0 | 1 | 1 |

Example 2

Configuration of Both Modes

In a second example the UE is also assumed to be capable of receiving four downlink carriers. Also, only the same 2 modes used in example #1 are possible in this example. However in this example the UE is configured by the network node to use both modes. As shown in table 3 the signalled code words will in accordance with this example be:
For mode #1: [0, 1, 1, 0, 0]
For mode #3: [1, 0, 0, 1, 1]

Thus the UE is then configured to receive data according to mode #1 for the first two component carriers and to receive data according to mode #3 in the last two component carriers.

In accordance with one embodiment one code word is signalled to the UE at a time. In such an embodiment the two modes will be activated in tandem.

Another possibility is to send both (or all if more than two code words are used) code words at the same time. In case more than one code word is sent at the time, the signalling overhead will increase proportional to the number of possible code words.

TABLE 3 code words for configuring mode #1 and 3

| Mode | Downlink carriers | | | |
|---|---|---|---|---|
| (bit) | 1 | 2 | 3 | 4 |
| 0 | 1 | 1 | 0 | 0 |
| 1 | 0 | 0 | 1 | 1 |

Mode-Only Selection Command

In one embodiment only one mode is activated at a time by signalling only the identity of the mode. The UE is expected to receive data over all possible carriers. However, it is up to the network node to use any of the carriers for the transmission depending upon various factors such as reporting CQI, load on carriers, UE data rate requirement, type of scheduling used, service type etc.

Alternatively if network is not expected to use all carries for particular or certain set of UEs then such UEs can be pre-configured to use only sub-set of component carriers. The pre-configuration can be done via higher layer signalling such as via Radio resource Control (RRC) signalling or by some predefined rule(s).

An advantage of using an approach including a signalling only indicating mode selection is that signalling overheads are reduced since explicit signalling, i.e. code word for activation of the mode(s) and corresponding carriers is typically sent via scheduling channel such as HS-SCCH. A drawback is that UE power consumption may increase.

Applicability to Uplink Multicarrier Transmission

In the above examples and descriptions downlink scenarios have been considered. However, the description and the examples equally apply to the uplink scenario where UE transmits data in the uplink using two or more carriers according to the configured mode. As stated above the configuration is signalled by the network node such as base station via downlink anchor carrier.

Signaling Channels

An indication or the code word can be signaled to the UE using by a suitable transmission channels via the anchor carrier. Different options are possible:
Using scheduling channel e.g. over HS-SCCH for the downlink and E-AGCH for the uplink.
In-band signaling such as via RRC signaling, which in turn could be multiplexed on HS-DSCH or DCH.
Using DPCH channels e.g. F-DPCH/A-DPCH.
Combination of two or more channels e.g. mode type via scheduling channel and activated carriers via in-band signaling.

When the UE is receiving data and/or control signaling on the non-anchor downlink carrier, an indication can also be signaled on the non-anchor downlink carrier that the UE shall switch to receive data and/or control on the anchor downlink carrier.

For the case with multiple uplink carriers, a similar indication as explained above can be sent to the UE to switch the transmission mode.

By Implicit Signaling

In this embodiment the use of particular mode is linked to the transmitted transport block size e.g. transport block size sent on anchor carrier. For instance if the transport block size on the anchor carrier is above a threshold or between certain range then a particular mode is to be used. The thresholds can be pre-defined or configured via higher layer signaling.

Pre-Defined Rules for Transmission Modes

Default Mode for Initial Transmission

When the UE is not scheduled on any carrier but anchored on a cell or a carrier e.g. in an idle mode or has just powered on a default mode indication can be either broadcasted or dedicatedly signaled by the network using the anchor carrier to some UEs. Either different or same modes can be set as the default modes for uplink and downlink transmissions. Alternatively the default mode can be set only for one of the direction i.e. either uplink or downlink.

Before receiving any mode change indication sent from the network, UE will prepare for receiving data, assuming the network currently uses this default mode for this UE. The default mode can be changed and or updated by the network for a UE via a high layer signaling when an RRC is established or when a UE does a location update. Later on the network can configure UE to receive according to any possible transmission mode.

Service Specific Default Modes

Another possibility is that a particular transmission can also be tied to a particular service e.g. mode #3 for real time service. Similarly as an example mode #1 can be pre-defined as the default mode for the packet data and so on. This means when UE initiates call using a particular service, it transmits or/and receives according to the pre-defined mode. However, the network node can change the mode anytime during the call. It can also configure UE to use more than one mode if that is possible and is required e.g. for different type of data transmission.

DRX Specific Default Modes

In this embodiment a particular transmission is tied to DRX and is pre-defined as a default mode when UE goes to DRX. For instance a mode with more robust performance can be the default mode in DRX to ensure maximum possible saving of UE power consumption. Yet another possibility is that different default modes are tied to different levels of DRX cycle e.g. different for short and long DRX cycles. Alternatively the default mode can be only for short or long DRX cycle operation.

Hybrid Scheme: Signaling and Pre-Defined Rule

In this embodiment any suitable combination of explicit signalling, implicit, and pre-defined or default rules can be used by the network node and the UE to determine which transmission mode to use at a given time in a given scenario.

For example the UE initiating call with packet data service uses mode #1 as the default one. But the network modifies it to mode #3. In another example the network additionally configures mode #3 for any service; thus UE uses both modes.

The methods and devices as described herein have been described within the context of multicarrier HSPA (Down Link HSDPA and Enhanced Up Link). However the method and device are equally applicable to other multicarrier systems such as advanced E-UTRAN, or the so-called LTE advanced.

Using the methods and devices as described herein for dynamically switch data transmission modes in a multicarrier radio system makes it possible to significantly improve the resource utilization and/or to increase the coverage. In addition the signaling overheads can be reduced.

The invention claimed is:

1. A method, implemented in a base station, of transmitting data between the base station and a user equipment in a cellular radio system, wherein data can be transmitted using at least two different modes for multicarrier transmission, allowing simultaneous transmission or reception of data blocks over more than one carrier frequency, and where a mode corresponds to a mapping of one or more data blocks over different carriers for transmission, the method comprising:

selecting at least two multicarrier transmission modes based on a predetermined criteria, wherein the selected at least two multicarrier transmission modes comprise at least two of:
a first multicarrier transmission mode configured to map different data blocks over different carriers;
a second multicarrier transmission mode configured to map interleaved data blocks over different carriers;
a third multicarrier transmission mode configured to map a repetitive data block over different carriers; and
a fourth multicarrier transmission mode configured to map a repetitive data block over different carriers in different transmission time intervals;

signaling the selected multicarrier transmission modes from the base station to the user equipment; and transmitting data to a first user equipment using one of the selected transmission modes while simultaneously transmitting data to a second user equipment using a different one of the selected transmission modes.

2. The method according to claim 1, wherein selecting the at least two multicarrier transmission modes comprises selecting the at least two multicarrier transmission modes based on one or more measurements performed by at least one of the user equipment and the base station.

3. The method according to claim 1, wherein selecting the at least two multicarrier transmission modes comprises selecting the at least two multicarrier transmission modes on one or more user equipment reported mode selection events, which are reported when one or more network configured event conditions are met.

4. The method according to claim 1, wherein selecting the at least two multicarrier transmission modes comprises selecting the at least two multicarrier transmission modes based on one or more of a ratio of transmitted power to the transmitted block size, a channel quality indicator, a signal strength, a signal quality, a block error rate, a user equipment transmitted power, and a base station transmitted power.

5. A base station adapted to transmit data to a user equipment in a cellular radio system, wherein data can be transmitted using at least two different modes for multicarrier transmission, allowing simultaneous transmission or reception of data blocks over more than one carrier frequency, and where a mode corresponds to a mapping of one or more data blocks over different carriers for transmission, the base station comprising:

a logic unit configured to select at least two multicarrier transmission modes, wherein the selected at least two multicarrier transmission modes comprises at least two of:

a first multicarrier transmission mode configured to map different data blocks over different carriers;

a second multicarrier transmission mode configured to map interleaved data blocks over different carriers;

a third multicarrier transmission mode configured to map a repetitive data block over different carriers; and a fourth multicarrier transmission mode configured to map a repetitive data block over different carriers in different transmission time intervals;

a transmitter configured to signal from the base station to the user equipment the selected multicarrier transmission modes, and transmit data to a first user equipment using one of the selected transmission modes while simultaneously transmitting data to a second user equipment using a different one of the selected transmission modes.

6. The base station according to claim 5, wherein the logic unit is configured to base the selection on one or more measurements performed by at least one of the user equipment and the base station.

7. The base station according to claim 5, wherein the logic unit is configured to base the selection on one or more user equipment reported mode selection events, which are reported when one or more network configured event conditions are met.

8. The base station according to claim 5, wherein the logic unit is configured to base the selection on one or more of a ratio of transmitted power to the transmitted block size, a channel quality indicator, a signal strength, a signal quality, a block error rate, a user equipment transmitted power, and a base station transmitted power.

9. A method, implemented in a user equipment, for transmitting data to a base station in a cellular radio system, wherein data can be transmitted using at least two different modes for multicarrier transmission allowing simultaneous transmission or reception of data blocks over more than one carrier frequency, and where a mode corresponds to a mapping of one or more data blocks over different carriers for transmission, the method comprising:

receiving signaling from the base station to indicate which of at least two modes are currently in use or to be used, wherein the modes currently in use or to be used comprises at least two of:

a first multicarrier transmission mode configured to map different data blocks over different carriers;

a second multicarrier transmission mode configured to map interleaved data blocks over different carriers;

a third multicarrier transmission mode configured to map a repetitive data block over different carriers; and a fourth multicarrier transmission mode configured to map a repetitive data block over different carriers in different transmission time intervals;

selecting at least two multicarrier transmission modes based on the received signaling; and transmitting a first type of data to the base station using one of the selected transmission modes while simultaneously transmitting a second type of data to the base station using a different one of the selected transmission modes.

10. A user equipment configured to transmit data to a base station in a cellular radio system, wherein data can be transmitted using at least two different modes for multicarrier transmission allowing simultaneous transmission or reception of data blocks over more than one carrier frequency, and where a mode corresponds to a mapping of one or more data blocks over different carriers for transmission, the user equipment comprising:

a receiver configured to receive signaling from the base station to indicate which of at least two modes are currently in use or to be used, wherein the modes currently in use or to be used comprises at least two of:

a first multicarrier transmission mode configured to map different data blocks over different carriers;

a second multicarrier transmission mode configured to map interleaved data blocks over different carriers;

a third multicarrier transmission mode configured to map a repetitive data block over different carriers; and a fourth multicarrier transmission mode configured to map a repetitive data block over different carriers in different transmission time intervals; and a logic unit configured to select at least two multicarrier transmission modes based on the received signaling; and a transmitter configured to transmit a first type of data to the base station using one of the selected transmission modes while simultaneously transmitting a second type of data to the base station using a different one of the selected transmission modes.

11. A method, implemented in a user equipment, for transmitting data to a base station in a cellular radio system, the method comprising:

monitoring one or more event conditions; and reporting a mode selection event when at least one of the event conditions are fulfilled;

wherein different types of data can be transmitted using at least two different modes for multicarrier transmission allowing simultaneous transmission or reception of data blocks over more than one carrier frequency using different ones of the at least two different modes for multicarrier transmission, where a mode for multicarrier transmission corresponds to a mapping of one or more data blocks over different carriers for transmission; and wherein the modes for multicarrier transmission comprise at least two of:

a first multicarrier transmission mode configured to map different data blocks over different carriers;

a second multicarrier transmission mode configured to map interleaved data blocks over different carriers;

a third multicarrier transmission mode configured to map a repetitive data block over different carriers; and a fourth multicarrier transmission mode configured to map a repetitive data block over different carriers in different transmission time intervals.

12. The method according to claim 11, wherein the one or more event conditions comprise one or more of:

a measured quantity or a signal quality falling below a threshold; and a measured quantity or a signal quality rising above a threshold.

13. A user equipment for transmitting data to a base station in a cellular radio system, the user equipment comprising:

a logic unit configured to monitor one or more event conditions; and a transmitter configured to report a mode selection event when at least one of the event conditions are fulfilled;

wherein different types of data can be transmitted using at least two different modes for multicarrier transmission allowing simultaneous transmission or reception of data blocks over more than one carrier frequency using different ones of the at least two different modes for multicarrier transmission, where a mode for multicarrier transmission corresponds to a mapping of one or more data blocks over different carriers for transmission; and wherein the modes for multicarrier transmission comprise at least two of:

a first multicarrier transmission mode configured to map different data blocks over different carriers;
a second multicarrier transmission mode configured to map interleaved data blocks over different carriers;
a third multicarrier transmission mode configured to map a repetitive data block over different carriers; and
a fourth multicarrier transmission mode configured to map a repetitive data block over different carriers in different transmission time intervals.

14. The user equipment according to claim 13, wherein the one or more event conditions comprise one or more of:
a measured quantity or a signal quality falling below a threshold; and
a measured quantity or a signal quality rising above a threshold.

15. A method of transmitting data between a base station and a user equipment in a cellular radio system, wherein data can be transmitted using at least two different modes for multicarrier transmission, allowing simultaneous transmission or reception of data blocks over more than one carrier frequency, and where a mode corresponds to a mapping of one or more data blocks over different carriers for transmission, the method comprising:
using pre-defined or default multicarrier transmission modes for initial transmission to transmit data between the base station and the user equipment using one multicarrier transmission mode while simultaneously transmitting data between the base station and the user equipment using a different one of the multicarrier transmission modes;
wherein the pre-defined or default multicarrier transmission modes comprise at least two of:
a first multicarrier transmission mode configured to map different data blocks over different carriers;
a second multicarrier transmission mode configured to map interleaved data blocks over different carriers;
a third multicarrier transmission mode configured to map a repetitive data block over different carriers; and
a fourth multicarrier transmission mode configured to map a repetitive data block over different carriers in different transmission time intervals.

16. An apparatus for transmitting data between a base station and a user equipment in a cellular radio system, wherein data can be transmitted using at least two different modes for multicarrier transmission, allowing simultaneous transmission or reception of data blocks over more than one carrier frequency, and where a mode corresponds to a mapping of one or more data blocks over different carriers for transmission, the apparatus comprising:
a logic unit configured to use pre-defined or default multicarrier transmission modes for initial transmission;
a transmitter configured to transmit data between the base station and the user equipment using one of the multicarrier transmission modes while simultaneously transmitting data between the base station and the user equipment using a different one of the multicarrier transmission modes
wherein the pre-defined or default multicarrier transmission modes comprise at least two of:
a first multicarrier transmission mode configured to map different data blocks over different carriers;
a second multicarrier transmission mode configured to map interleaved data blocks over different carriers;
a third multicarrier transmission mode configured to map a repetitive data block over different carriers; and
a fourth multicarrier transmission mode configured to map a repetitive data block over different carriers in different transmission time intervals.

\* \* \* \* \*